United States Patent [19]

Karnemaat

[11] 3,713,800

[45] Jan. 30, 1973

[54] PROCESS FOR PRODUCING GARBAGE BASED FERTILIZER

[76] Inventor: John N. Karnemaat, 1304 W. Maple St., Kalamazoo, Mich. 49001

[22] Filed: May 24, 1971

[21] Appl. No.: 146,521

Related U.S. Application Data

[63] Continuation of Ser. No. 775,116, Nov. 12, 1968, abandoned.

[52] U.S. Cl. ............................71/14, 71/28, 71/29
[51] Int. Cl. ............................C05f 9/00, C05c 9/00
[58] Field of Search........71/28, 64 G, 64 RC, 13, 14, 71/19, 8, 9, 10, 29, 30

[56] References Cited

UNITED STATES PATENTS

| | | | |
|---|---|---|---|
| 3,073,693 | 1/1963 | Niellson et al. | 71/13 |
| 3,451,799 | 6/1969 | Brown | 71/9 |
| 3,006,753 | 10/1961 | Harvey | 71/29 |
| 3,076,700 | 2/1963 | Renner | 71/64 G |
| 3,220,824 | 11/1965 | Church | 71/28 |
| 3,333,940 | 9/1967 | Ridgeway | 71/28 X |
| 3,142,557 | 7/1964 | MacDuffe | 71/9 |

*Primary Examiner*—Samih N. Zaharna
*Assistant Examiner*—Richard Barnes
*Attorney*—Woodhams, Blanchard and Flynn

[57] ABSTRACT

A fertilizer is made by adding dry fertilizer chemicals, including urea, to dry composted organic waste materials, following which a mixture of prepolymer of urea and formaldehyde suspended in an excess of formaldehyde is added and then phosphoric acid or other mineral acid is added in order to produce the fertilizer product.

6 Claims, No Drawings

PROCESS FOR PRODUCING GARBAGE BASED FERTILIZER

This application is a continuation of Ser. No. 775,116 filed Nov. 12, 1968 and now abandoned.

BACKGROUND OF THE INVENTION

1. Field of the Invention

This invention relates to a process for making a granular or free-flowing, relatively dust-free, organic waste material-based, fertilizer product in which a substantial portion of the total available nitrogen is present in a slowly available form passing accepted A.O.A.C. tests as a water insoluble slow release nitrogen fertilizer and which product may contain a large proportion of cellulosic fibers for moisture holding and soil building purposes.

2. Description of the Prior Art

It has long been recognized that organic waste materials, such as sewage, garbage and many other municipal and factory waste materials, have plant nutrient values which render them useful as plant fertilizers. For example, composted garbage and sewage sludge contain relatively insignificant amounts of inorganic plant nutrients, such as nitrogen and phosphorus, trace amounts of other elements useful for plant growth purposes, such as iron and manganese, and organic material which is useful for soil conditioning and/or humus building purposes. They may contain large amounts of paper or other cellulosic fiber materials, as well as fatty materials, which are useful for moisture holding purposes and which are susceptible to biochemical decomposition in soil so as to add humus to the soil. However, the plant nutrient value of these organic waste materials is variable and generally is of a relatively low order. Further, the physical condition of the organic waste materials is generally not satisfactory to enable them to be used as a fertilizer because they may contain a large amount of water and an unacceptably large proportion of relatively fine particles or particles of widely different sizes, they may not be free flowing and they may cause odor problems. Moreover, they may be somewhat unstable due to the presence of fermentable materials. Thus, because of the low plant nutrient value and undesirable physical characteristics of organic waste materials, they have largely been supplanted by synthetic inorganic fertilizers which can be manufactured to have a high plant nutrient value and desirable, relatively closely controllable, physical characteristics which make them easy to apply.

Municipalities produce huge amounts of organic waste materials which must be disposed of. It is common to incinerate such materials, but this technique is not completely satisfactory, it causes air pollution problems and it is unprofitable and time-consuming. Further, it is common to bury municipal waste materials, but this technique also is not completely satisfactory because vermin infest the disposal site and conveniently available land fill areas suitable for this purpose are rapidly becoming exhausted. Further, both techniques can be relatively expensive and they waste the valuable organic plant materials, which is contrary to principles of conservation.

Many municipalities dispose of waste materials including both sewage and garbage, by techniques which involve various types of biological decomposition procedures. These techniques produce a solid product composed primarily of organic waste material containing a large amount, commonly from 20 to 40 percent by weight, of water. This product is commonly referred to as "composted garbage" or "composted sludge."

The term "composted organic waste materials," as used in the following description and claims, is intended to refer to and include the solid materials (containing water, as aforesaid) recovered from municipal waste treatment plants as well as other solid sludges or proteinaceous materials recovered from various industrial and municipal treatment plants. This term further includes, without limitation, the solid products of the activated sludge method or the digestion method of effecting biochemical decomposition of organic waste materials. These waste materials may contain relatively small percentages of nitrogen and phosphorus and other minor amounts of trace elements which also are useful as aids to plant growth.

Low molecular weight urea-formaldehyde condensation products (urea-form) are widely used in fertilizers in order to supply nitrogen to soil. A substantial portion of the nitrogen in such urea-formaldehyde condensation products is slowly soluble in soil fluids so that a single application supplies plant sustenance over a prolonged period. Further, urea-formaldehyde condensation products are less likely to burn plants than many other types of nitrogen-supplying fertilizer chemicals.

It has been suggested to form urea-formaldehyde condensation products on various types of bases or carriers, including combinations of sewer sludge and peat moss. It has been previously taught that the presence of peat moss is essential in such a fertilizer composition in order to avoid the forming of a solid mass which would require grinding before the material could be used as a fertilizer.

The prior techniques for making urea-formaldehyde condensation products for use in fertilizers required careful control of the mol ratios of the reactants, as well as the temperature, time and other conditions of the reaction in order to form acceptable products. Moreover, it has not been suggested previously, insofar as I am aware, to adjust the amount of cold water insoluble nitrogen in urea-formaldehyde condensation products by reacting only a part of the urea and the formaldehyde under such conditions that a prepolymer, believed to be a mixture of methylol ureas, is formed and then this prepolymer mix is further reacted in the presence of a carrier and additional urea, and catalyzed by phosphoric acid or other mineral acid so as to form on the carrier a urea-formaldehyde condensation product containing a selectable and adjustable portion of cold water insoluble nitrogen.

Accordingly, it is an object of this invention to provide an improved method of making a fertilizer composition in which composted organic waste material containing urea is mixed with a mixture of prepolymers of urea and formaldehyde, containing an excess of formaldehyde, following which phosphoric or other mineral acid is added to catalyze the condensation reaction and to improve the granulation characteristics of the product whereby there is formed a fertilizer composition containing a preselectable, adjustable amount of cold water insoluble nitrogen capable of providing sustained release of nitrogen after it is applied to soil.

I have discovered, unexpectedly in view of the prior art, that fertilizer chemicals, including a preselected amount of a low molecular weight urea-formaldehyde condensation product, can be incorporated in composted organic waste materials, without requiring the addition of other base or carrier materials, in order to form a fortified, granular, relatively dust-free, fertilizer composition having slow nitrogen release characteristics. Moreover, according to the present invention, said fertilizer elements, intimately blended and absorbed on small particles of "activated," "defatted" composted organic waste materials, provide advantageous and effective preparations for enhancing plant growth. That is to say, according to the present invention, the fertilizer chemicals are so carried, supported or held on the composted organic waste materials that said chemicals are more effectively available for plant nutrition purposes, as compared with fertilizer chemicals supported on other base materials, such as sand, vermiculite, etc. and their release rate is more realistically timed to the actual plant needs.

SUMMARY OF THE INVENTION

According to the present invention there is provided a process for producing a granular, relatively dust-free fertilizer having slow nitrogen release characteristics in which composted organic waste materials are dried until the moisture content thereof is less than about three percent so that they become easily grindable. The composted organic waste materials are ground or otherwise subdivided to reduce the particle size thereof. The dried composted organic waste material is then admixed with dry phosphorus-supplying material (which may also include nitrogen-supplying material), potassium-supplying material and urea and the mixture is blended in order to make same substantially uniform as to chemical content and particle size. Separately, there is formed a solution obtained by mixing formaldehyde and urea with there being an excess of formaldehyde in the solution over and above that capable of reacting with the urea in the solution within a period of 20-30 minutes at room temperature. This solution is permitted to react in order to make a precursor or prepolymer of a urea-formaldehyde condensation product, which product is suspended in the excess of formaldehyde. The prepolymer is believed to be a mixture of methylol ureas. The suspension of the urea-formaldehyde prepolymer and the excess formaldehyde is added to the mixture of dry composted organic waste materials and fertilizer chemicals and is vigorously mixed therewith in order to form a damp mass which is substantially uniform as to chemical content and size. Then a phosphoric acid or other mineral acid solution is added to the damp mass in order to form a dispersion and to catalyze or create favorable pH conditions for a further reaction between the contents of the mass, including a condensation reaction between the excess formaldehyde, the prepolymer and the urea added to the composted organic waste materials and in order to improve the granulation characteristics of the product. Water can also be added separately or as a vehicle for the dilution of the phosphoric acid, depending on the mechanics used for the final granulation. All of the constituents are simultaneously vigorously mixed in order to achieve homogeneity of the dispersion. The dispersion is then subjected to agglomeration and/or pelletization as a step preparatory to screening and bagging. A "curing" step may precede or replace drying depending on the formulation. The "curing" step refers to a step of allowing the fertilizer product to remain at rest for a period of time without adding external heat or performing other operations, except possibly to turn over the fertilizer product to expose different portions thereof to the ambient air. Some continued crystallization of the chemicals in the fertilizer may take place during the curing step.

As an example of a composted organic waste material which can be used in the present invention, there can be used the solid product of an aerobic or anaerobic digestion of garbage and/or sewer sludge from a municipal waste treatment plant. Following completion of the digestion procedure, the composted organic waste material is heated to a suitable temperature, commonly above about 250° F. for a short time without burning or charring same. After screening to remove large objects, the compost can then be shredded to about −4 mesh (Tyler Standard screen) size. This material contains relatively low amounts of fertilizer chemicals and it may have, for example, an N-P-K analysis of about 1-2-. A substantial proportion, usually in the range of 50-75 percent by weight, of the composted organic waste material is comprised of paper and other cellulosic fiber materials. It is specifically to be noted that these cellulosic fiber materials can be retained in the composted organic waste material that undergoes the processing according to the present invention. The composted organic waste material also contains trace amounts of many metals, other decomposable and non-decomposable elements, glass particles, fatty materials and usually contains about 20-40 percent by weight moisture.

The composted organic waste material is then dried at a temperature of about 250° F., or higher, in order to effect volatilization of a part of the fatty materials and an impregnation or absorption of another part of the fatty materials in the cellulosic materials. Typically, this drying step reduces the fatty material content from about 5 percent by weight to 1 −3 percent. If desired, more fatty materials can be extracted by a suitable solvent such as petroleum ether. However, this is not essential because the presence of a small amount of fatty materials does not significantly hinder the subsequent treatments. Also, the fatty material may have some value for soil building or conditioning purposes. The retained fatty materials are in a state in which same are not dispersible in water. This drying also reduces the moisture content of the compost to less than about 3 percent. In the drying step, care is taken so that no charring of the composted organic waste material takes place.

The dry composted organic waste material containing less than about 3 percent moisture is then subdivided by any suitable mechanism, such as a hammer mill, so that the particle size thereof is reduced, preferably to a size such that at least about 80 percent by weight of the composted organic waste material will pass through a 20 mesh screen. It has been found that the step of drying and reducing the particle size of the composted organic waste material to the size range indicated above has the unexpected result of so conditioning the composted organic waste material that the fertilizer chemicals can be readily adsorbed or absorbed thereon in a condition conducive to the formation of an efficient and advantageous source of plant nutrients for soil. The reduction of the moisture content of the compost to less than about three percent is advantageous because it reduces the demand on the subsequent drying step and, more importantly, makes it possible to easily subdivide the composted organic waste material so that it is capable of being mixed with the fertilizer chemicals more easily and more uniformly.

The dry fertilizer chemicals are then added to the compost and are uniformly mixed therein. The fertilizer chemicals include a phosphorus-supplying material (which may also include a nitrogen-supplying material), a potassium-supplying material and urea. The dry phosphorus-supplying and potassium-supplying materials can be selected from a wide variety of such materials which are known to workers in the art. It is usually preferred, for reasons of cost and ease of handling, to use diammonium phosphate, which supplies both nitrogen and phosphorus, and potassium chloride or muriate of potash, which supplies potassium. Any grade of urea is satisfactory but, for reasons of economy, it is preferred to use the fertilizer or technical grade urea (45 percent minimum N) for the purposes of the present invention. The urea is used in the form of particles, commonly referred to as shotted or prilled urea. Under certain circumstances crystalline urea may be used to advantage because of its smaller particle size and faster reaction time. The dry fertilizer chemicals desirably should be ground to substantially the same size range as the composted organic waste material. This assists in their intimate blending in the slurry step.

The dry fertilizer chemicals can be mixed together before they are added to the dry composted organic waste material or they can be more or less simultaneously and separately added to the dried composted organic waste material while same is undergoing vigorous agitation. The dry composted organic waste material and the dry fertilizer chemicals are then vigorously agitated and blended together so as to form a mixture which is substantially uniform as to chemical content and particle size.

Separately, there is formed a suspension of formaldehyde and urea. The formaldehyde may be provided in the form of the usual aqueous solution containing 37 percent by weight formaldehyde, or in the form of a more concentrated aqueous solution containing about 44 percent by weight formaldehyde. The presence of methanol in the aqueous formaldehyde solution is not objectionable. The urea can be supplied in any suitable form, such as the technical or fertilizer grade thereof, as discussed above.

In designing the fertilizer composition so as to obtain a fertilizer product having the desired N-P-K ratio, the total amount of urea needed will be calculated in advance and a selected portion thereof will be supplied as dry urea to the dry composted organic waste material as discussed above. The balance of the urea will be supplied in the urea-formaldehyde suspension. The total amount of the formaldehyde supplied to the suspension, however, will be in excess of that required to react with the urea in the suspension whereby, as will be described hereinbelow, there is provided excess formaldehyde which can react with the urea previously added to the dry composted organic waste material.

The ratio of the amount of urea added to the dry composted organic waste material and the amount of urea mixed with the formaldehyde will be selected, as required, to provide the proper desired ratio of more rapidly available nitrogen (cold water soluble nitrogen) and the slowly available nitrogen (cold water insoluble nitrogen) in the final fertilizer product. Generally, it is desired that at least about 25 percent of total available nitrogen is slowly available nitrogen.

By increasing the amount of urea added to the dry composted organic waste material, the amount of immediately available nitrogen in the fertilizer product will be increased because this portion of the urea has less opportunity to react with the excess formaldehyde. Conversely, by increasing the amount of urea premixed with the formaldehyde, the amount of slowly available nitrogen in the fertilizer product will be increased because the condensation reaction will be more complete.

Thus, the procedure according to the present invention, in which only a selectable portion of the urea is reacted with the formaldehyde before adding it to the composted organic waste material, makes it possible to design a variety of fertilizer products which differ in the relative amounts of readily available and slowly available nitrogen by adjusting the amounts of urea added at the respective stages of the process.

The mol ratio of urea added to the formaldehyde is from 1–1.5:1, preferably about 1.3:1.

When the urea-formaldehyde solution is first mixed, there occurs an endothermic reaction. If no external heat is supplied, the preparation of the urea-formaldehyde suspension to a condition suitable for adding to the mixture of dry ingredients is substantially complete when the suspension again reaches room temperature, about 70° F., which usually happens in about 20 to 30 minutes. The suspension may be agitated during the period. If desired, heat can be supplied to the urea-formaldehyde solution or the chemicals can be supplied in a hot condition in order to accelerate the reaction. The final solution is a suspension of the reaction product of formaldehyde and urea plus the excess formaldehyde and water.

The reaction product of the urea-formaldehyde reaction is believed to be a prepolymer, such as a mixture of methylol ureas. During the subsequent step of the process in which phosphoric acid or other mineral acid is added, the prepolymer is believed to be substantially converted to the low molecular weight urea-formaldehyde condensation product which, when applied to soil, provides the slowly available nitrogen. The suspension of the urea-formaldehyde prepolymer, excess formaldehyde and water is then added to the mixture of the dry composted organic waste material and dry fertilizer chemicals and is vigorously mixed therewith in order to form a relatively damp mass. It is noted here that the only water added in the process up to this point is that supplied with the urea-formaldehyde solution. After the urea-formaldehyde solution and the dry ingredients have been thoroughly mixed, an aqueous mineral acid solution is added, as by spraying, in a sufficient quantity to give a relatively thick slurry and is uniformly mixed therewith. It is preferred to use phosphoric acid because it also supplies plant nutrient value. However, HCl, $H_2SO_4$ and $HNO_3$ can be used, if desired. The contact of the phosphoric acid with the urea and formaldehyde materials is believed to shift the pH thereof to the acid side, between pH 2-4, in order to promote or catalyze the condensation reaction leading to the formation of the urea-formaldehyde condensation product. The hardness of the final product can be controlled by adjusting the amount of the phosphoric acid added to the mixture in order to control the completeness or complexity of the condensation reaction. Further, the excess formaldehyde is also capable of reacting to some extent with the dry urea supplied to the dry composted organic waste materials earlier in the process.

The relationship in the final product between the composted organic waste materials, the dry fertilizer chemicals and the reaction between the urea-formaldehyde prepolymer and the excess formaldehyde and the phosphoric acid is exceedingly complex. However, it is believed that there is a "surface reaction" between the composted organic waste materials and the other chemicals whereby the chemicals are absorbed or adsorbed on the composted materials in a unique way so that the chemicals are made available to soil in a more diffuse and longer-lived manner than if only a simple mechanical mixture were involved. The fertilizer chemicals, particularly nitrogen, may be immobilized or held against rapid availability by being bound up in the carbonaceous material. Also, in addition to the urea-formaldehyde condensation products, the chemicals may react to form a urea-ammonium-phosphate complex. The reactions(s) may result in the formation of a binder which further results in a unique physico-chemical relationship. Also some reaction(s) between the chemicals takes place in situ on the composted particles, thus resulting in an intimate dispersion thereof on the compost which produces a particularly useful fertilizing material. The condensation reactions between the urea and formaldehyde are of varying complexities and may be completed in some zones, partially completed in other zones and remain substantially unreacted in still other zones so that the total available nitrogen is present in a variety of different ways of different water solubilities whereby there is a gradual release of nitrogen when the fertilizer is applied to soil. Further, the constituents may react to form complexes which also contribute to the desired properties of the fertilizer product. An entirely unexpected result of the procedure according to the present invention is that a substantial proportion, usually from 15-40 percent by weight, of the total phosphorus- and potassium-supplying materials are coated or otherwise bonded or held in a form which makes them also slowly available to soil so that the fertilizer product provides sustained release of all three fertilizer chemicals (N-P-K). The cold water insoluble phosphorus and potassium are measured by tests similar to the A.O.A.C. test for cold water insoluble nitrogen.

As the pH of the composted organic waste material can be expected to vary somewhat, and the pH of the mixture of dry ingredients and its buffering powers will vary depending on the proportions desired in the final product, the amount of phosphoric or mineral acid needed will also vary. The pH of the "slurry" containing all the ingredients should be not higher than 4.0 nor lower than 2.0 to effect a product with desirable slow release characteristics. The concentration of the phosphoric acid added can be of any suitable value to provide the proper ratio of water in the slurry to enable the fertilizer product to be dried and granulated.

The slurry can be heated, if desired, but care should be taken that the slurry is not heated to a temperature over about 170° F. to prevent undue deterioration of free or unreacted urea. The time period between the adding of the suspension of the reaction product plus formaldehyde and the addition of phosphoric acid is not critical but should be completed within 4-6 hours. Mixing of the phosphoric acid with the other constituents is carried out until a homogenous mixture is obtained.

The slurry can then, if necessary, be subjected to a drying operation, such as in a fluid-bed drier, in order to remove excess water therefrom in order to produce a dry granular fertilizer product containing less than about 5 percent water. It can then be screened and bagged in a conventional fashion. It is also possible that room temperature curing will result in a satisfactory product, depending on the techniques of pelletizing.

The process can be carried out on a continuous or batch basis.

The fertilizer is a granular, relatively dust-free fertilizer having slow nitrogen release characteristics. The density of the fertilizer will be relatively low, for example, about 20-25 pounds per cubic foot. The chemical analysis of the fertilizer can be controlled by appropriate selection of the amounts of the fertilizer chemicals used. Similarly, as noted above, the relative amounts of readily available (cold water soluble) and gradually available (cold water insoluble) nitrogen can be adjusted by controlling the relative amounts of urea added (1) to the dry composted organic waste material and (2) to the formaldehyde. The fertilizer granules will be substantially non-friable and only slightly compressible and they will contain substantial quantities of cellulose fibers so that they will also be effective for soil building purposes.

The following examples further illustrate the invention. It is understood that the invention is not limited to the specific features of these examples.

In the following examples, all references are to parts by weight.

EXAMPLE I

Two hundred eighty-six parts per hour of composted organic waste material containing about 32 percent by weight water were dried at about 250° F. and 86 parts of water were removed therefrom. Two hundred parts of the dried composted organic waste material containing less than 3 percent by weight of water were fed to a grinder wherein the particle size thereof was reduced so that 80 percent by weight passed through a 20 mesh screen. The material was then mixed with 78 parts $(NH_4)_2HPO_4$ (22-52-0), 45 parts of muriate of potash (0-0-60) and 105 parts of urea (45 percent minimum N). Then there was added a suspension containing 100 parts of an aqueous formaldehyde (37 percent) and 105 parts of urea. The suspension was previously formed by adding the urea to the formaldehyde solution and allowing it to react for 20-30 minutes with agitation and without external heating. After the suspension was uniformly mixed into the dry mixture as described, 100 parts of phosphoric acid solution containing 50 parts water and 50 parts commercial grade phosphoric acid (75 percent by weight $H_3PO_4$) was added and blended until homogeneous. Then this slurry was partly dried, pelletized by a baffle-screen process and then completely dried at a temperature not exceeding 170°F.

The resulting fertilizer product has the following analysis:

| | |
|---|---|
| Total Nitrogen (percent) | 21.70 |
| Cold Water Soluble Nitrogen (percent) | 16.6 |
| Cold Water Insoluble Nitrogen (percent) | 5.10 |
| Total P (as $P_2O_5$) | 13.30 |
| Total K (as $K_2O$) | 5.21 |

The following table lists the relative amounts by weight of fertilizer chemicals which can be added to a composted organic waste material in order to obtain, by the same process as described above, a fertilizer product having the analysis set forth below:

| | |
|---|---|
| Dry Compost | 150 gm. |
| Urea | 100 gm. |
| Diammonium phosphate | 60 gm. |
| Muriate of potash | 112 gm. |
| Urea | 100 gm. |
| Formaldehyde | 95 gm. |
| 50% $H_3PO_4$ | 100 gm. |

Analysis

| | |
|---|---|
| Total Nitrogen (%) | 19.80 |
| Cold Water Soluble (%) | 15.85 |
| Cold Water Insoluble (%) | 3.95 |
| Total P (as $P_2O_5$) | 12.1 |
| Total K (as $K_2O$) | 11.7 |

EXAMPLE II

The following table lists the comparative results achieved by adjusting the relative amounts of urea (1) added with dry fertilizer chemicals and (2) added to the formaldehyde. In the following table, the term "A composition" refers to the amounts of dry fertilizer chemicals added to the compost. The term "B composition" refers to the composition of the urea-formaldehyde suspension. The processing steps are the same as in Example I. 200 gms. of compost were used. 100 ml. of $H_3PO_4$ solution (50 percent by volume) were used.

The results were as follows:

| Composition of reactants | Test 1 | Test 2 | Test 3 (comparative) |
|---|---|---|---|
| A composition | | | |
| Urea (crystalline) in gms. | 105 | 189 | 0 |
| $(NH_4)_2HPO_4$ (24-52-0) in gms. | 78 | 78 | 78 |
| Muriate of Potash (0-0-60) in gms. | 45 | 45 | 45 |
| B composition | | | |
| Urea (crystalline) in gms. | 105 | 21 | 210 |
| Formaldehyde (37%) in gms. | 100 | 100 | 100 |
| Composition of Produce | | | |
| Total Nitrogen (%) | 21.9 | 24.7 | 20.1 |
| cold water soluble (%) | 16.8 | 21.4 | 6.0 |
| cold water insoluble (%) | 5.06 | 3.3 | 14.1 |
| Total P (as $P_2O_5$) | 11.0 | — | — |
| cold water insoluble P | 2.1 | — | — |
| Total K (as $K_2O$) | 5.4 | — | — |
| cold water insoluble K | 0.96 | — | — |

A further control over the amount of cold water insoluble nitrogen involves adjusting the amount of formaldehyde used. Referring to Test 1 of Example II, when the amount of formaldehyde is changed to 50 grams, the amount of the cold water insoluble nitrogen is 5.1 percent by weight of the total nitrogen, and when 150 grams of formaldehyde was used, the cold water insoluble nitrogen was 55.2 percent by weight of the total nitrogen.

Other carriers, such as vermiculite, peat moss, sand and the like, can be used in place of the subdivided, dried, composted organic waste material used in the preferred embodiment of the invention. The fertilizer products obtained using different carries cannot be as effective as the fertilizer product of the preferred embodiment, but they do have advantages as compared with commercial fertilizer products. Particularly, they will also contain substantial quantities of cold water insoluble potassium and phosphorus and the relative amounts of cold water soluble and cold water insoluble nitrogen can be adjusted by changing the relative amounts of urea (1) added with the dry fertilizer chemicals and (2) added to the formaldehyde.

Although particular preferred embodiments of the invention have been described above in detail for illustrative purposes, it will be understood that variations or modifications of such disclosure which fall within the scope of the appended claims are fully contemplated.

What is claimed is:

1. In a process for producing a granular, relatively dust-free fertilizer having slow nitrogen release characteristics, the steps comprising:
   1. heating composted garbage from municipal garbage treatment plants to a temperature of at least about 250° F. and below the charring temperature of said composted garbage and removing water and volatilized fat therefrom to reduce the water content thereof to not substantially in excess of about 3 percent by weight;
   2. then subdividing the dried composted garbage to form same into small particles so that at least about 80 percent by weight of the particles pass through a 20 mesh screen;
   3. then admixing urea particles with said dried composted garbage particles and blending same in order to make a dry mixture which is substantially uniform as to chemical content and particle size, said mixture containing composted garbage particles as the sole organic carrier material therein;
   4. separately providing an aqueous solution containing a urea-formaldehyde prepolymer and excess formaldehyde;
   5. then adding the aqueous solution of prepolymer and formaldehyde to said dry mixture and vigorously mixing the solution and mixture together to form a damp mass which is uniform as to chemical content;

6. then adding an aqueous mineral acid solution to the damp mass in order to form a slurry having a pH of between about 2 and about 4 and vigorously mixing the slurry in order to maintain the uniformity of the chemical content and size of the ingredients in the slurry whereby to effect a chemical reaction of the ingredients of the slurry including a condensation reaction between said urea and said excess formaldehyde;

7. then removing water from the slurry to obtain the fertilizer product.

2. A process according to claim 1, in which in step (3) particles of phosphorus-supplying material and potassium-supplying material are admixed with said dried composted garbage.

3. A process according to claim 1, in which the mol ratio of urea to formaldehyde in said solution is from 1–1.5:1.

4. A process according to claim 1, in which the mineral acid is phosphoric acid.

5. A process according to claim 1, in which the relative amounts of the urea added to (1) said dried composted garbage and (2) said formaldehyde solution are adjusted in order to obtain a fertilizer product having selectively variable amounts of readily available nitrogen and slowly available nitrogen.

6. A process according to claim 2, in which said phosphorus-supplying material is $(NH_4)_2HPO_4$ and said potassium-supplying material is potassium muriate.

* * * * *